R. M. HALLIDAY.
TIRE PROTECTOR.
APPLICATION FILED FEB. 1, 1910.
981,640.
Patented Jan. 17, 1911.
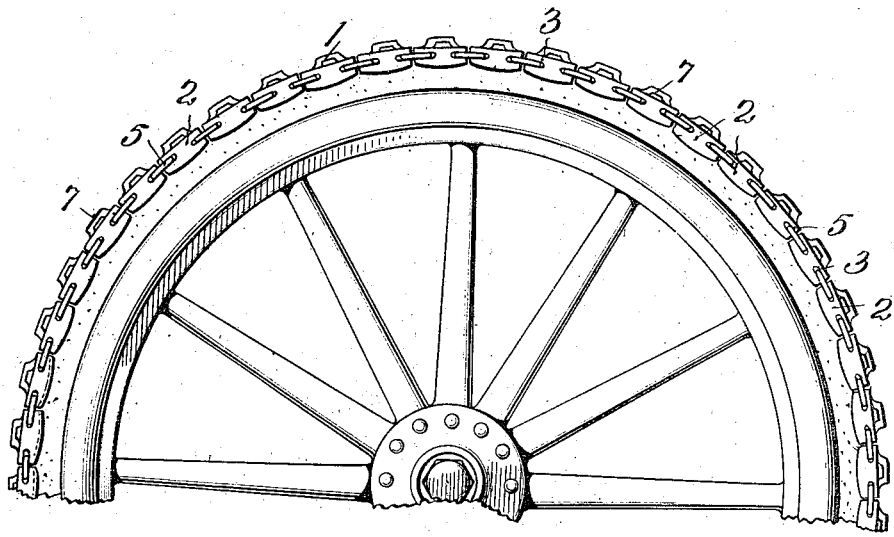
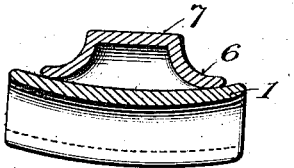
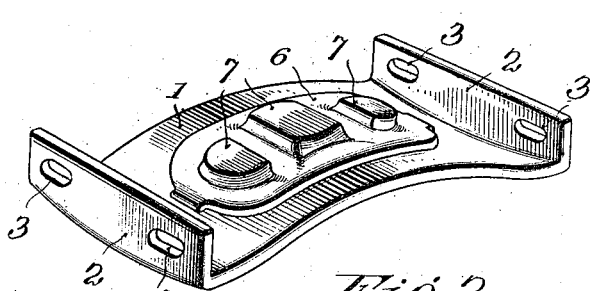
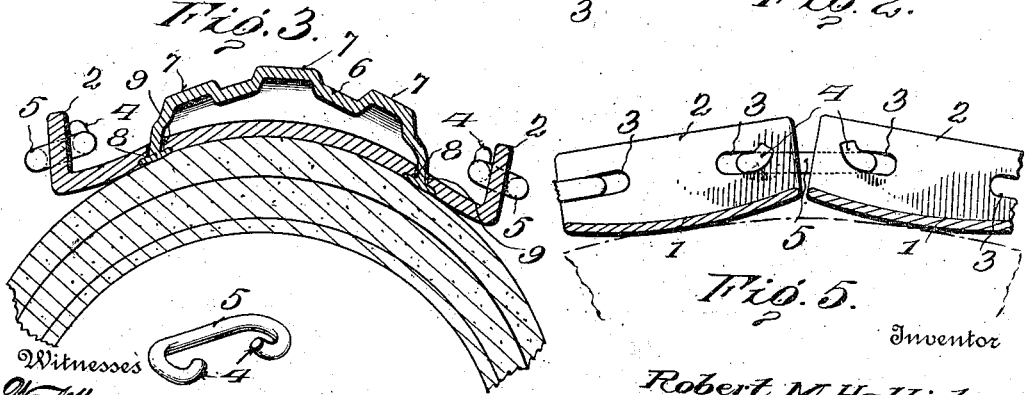
Inventor
Robert M. Halliday

UNITED STATES PATENT OFFICE.

ROBERT M. HALLIDAY, OF MOUNT GILEAD, OHIO, ASSIGNOR OF ONE-HALF TO GRANT C. HALLIDAY, OF MOUNT GILEAD, OHIO.

TIRE-PROTECTOR.

981,640.  Specification of Letters Patent.  Patented Jan. 17, 1911.

Application filed February 1, 1910. Serial No. 541,365.

*To all whom it may concern:*

Be it known that I, ROBERT M. HALLIDAY, a citizen of the United States, residing at Mount Gilead, in the county of Morrow and State of Ohio, have invented certain new and useful Improvements in Tire-Protectors, of which the following is a specification.

This invention comprehends certain new and useful improvements in tire protectors, and relates particularly to externally applied anti-slipping devices.

The invention has for its primary object a simple, durable and efficient construction of device of this character which may be easily applied to the casing of a tire of an automobile or other vehicle, the device embodying any desired number of plates arranged in a circular series, the plates being preferably constructed of sheet metal and provided with preferably sheet metal anti-skidding sections, the plates being connected together by preferably open links, whereby the device may be easily applied and readily removed and whereby any one or more of the plates may be removed when damaged and replaced by a new one.

With this and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a side elevation of a portion of a vehicle wheel, the tire of which is equipped with my improved protector and anti-slipping device; Fig. 2 is a detail perspective view of one of the plates which make up the protector when linked together, as hereinafter specified; Fig. 3 is a transverse sectional view through one of the plates; Fig. 4 is a sectional view at right angles to Fig. 3; Fig. 5 is a section taken longitudinally of the wheel rim, the section being taken through two adjoining plates; and, Fig. 6 is a detail perspective view of one of the links employed.

Corresponding and like parts are referred to in the following description and indicated in all the views of the drawings by the same reference characters.

My improved tire protector or anti-slipping device which is designed to be applied to the tread surface of a tire, comprises any desired number of transversely extending plates 1, said plates being preferably constructed of sheet metal, stamped and shaped at one operation, and being of any desired width, length and thickness, according to the particular wheel for which they are intended, it being, of course, understood that the devices will, in manufacture, be made up in different sizes according to the size of the tire for which they are designed. Each plate is preferably bowed, not only in a direction at right angles to the longitudinal plane of the tire to which the device is applied, but also in a circumferential direction, as best illustrated in Figs. 3, 4 and 5, and the ends of the plates are turned upwardly to form flanges 2, as best illustrated in Figs. 2 and 3. Each flange 2 is formed, preferably near its ends, with apertures 3, said apertures being designed to receive the ends 4 of open links 5, said ends being outwardly offset in a radial direction, as clearly illustrated in the drawing and insuring the free movement of the parts as well as providing against accidental displacement or detachment. The main portion or bars of the links are preferably located outermost, as clearly indicated in Fig. 1.

The flanges 2 themselves constitute anti-skidding elements, but preferably each plate 1 is formed with additional safe-guards in the form of preferably sheet metal sections 6 which are formed with any desired number of protuberances or swells 7, whereby to engage the surface of the road and insure against slipping. These sections 7 extend transversely of the tire, as do the plates 1 and are preferably secured to the plates by tangs 8 which are formed on the ends of the sections and which are designed to extend into and be riveted in slots 9 formed in the plates.

From the foregoing description in connection with the accompanying drawing, the operation of my improved anti-slipping device or tire protector will be apparent.

In the practical use of the device, the band constituted by the entire set of plates 1 is opened at any desired point by removing correspondingly opposite links 5 from one of the plates 1, the device being then placed circumferentially around the tread surface of the tire and the partially detached links being subsequently secured in place again. Obviously, the parts will yield as they are connected together by freely articulating joints, while at the same time their formation and their construction and arrangement will insure that they shall be securely held on the wheel as against accidental displacement and that they will produce a proper tread surface and prevent slipping and skidding.

Manifestly, the parts of the device may be cheaply manufactured as they are preferably constructed out of sheet metal, and they may be readily assembled and applied and readily detached whenever necessary to replace any parts that may be broken or otherwise become unfit for further service.

Having thus described the invention, what is claimed as new is:

A tire protector consisting of a plurality of plates bowed both in a direction at right angles to the longitudinal plane of the tire and also in a circumferential direction, whereby to fit the cross sectional contour of the tire, the plates being so bowed circumferentially of the tire, that they will present convex faces to the tread surface of the tire when applied, each plate being formed at its ends with outwardly turned flanges, and the flanges being formed with slots that are elongated in a direction circumferentially of the tire, and open links having offset ends received in the apertures of the adjoining flanges, whereby to movably and detachably connect the said plates together, the offset ends of the links being disposed inwardly.

In testimony whereof I affix my signature in presence of two witnesses.

ROBERT M. HALLIDAY. [L. S.]

Witnesses:
W. N. WOODSON,
FREDERICK S. STITT,